United States Patent
Liu

(10) Patent No.: US 9,768,845 B2
(45) Date of Patent: Sep. 19, 2017

(54) SYSTEM AND METHOD FOR DETECTING OPERATION STATE OF A MOBILE TERMINAL TO ADAPTIVELY ADJUST ANTENNA STATE

(71) Applicant: Spreadtrum Communications (Shanghai) CO., LTD., Pudongxinqu, Shanghai (CN)

(72) Inventor: Mingbo Liu, Shanghai (CN)

(73) Assignee: Spreadtrum communications (Shanghai) Co., Ltd., Shanghai (CN)

(*) Notice: Subject to any disclaimer, the term of this patent is extended or adjusted under 35 U.S.C. 154(b) by 0 days.

(21) Appl. No.: 14/954,472

(22) Filed: Nov. 30, 2015

(65) Prior Publication Data

US 2017/0187438 A1 Jun. 29, 2017

(30) Foreign Application Priority Data

Nov. 28, 2014 (CN) .......................... 2014 1 0714990

(51) Int. Cl.
| | |
|---|---|
| *H04B 7/08* | (2006.01) |
| *H04B 7/06* | (2006.01) |
| *H04W 4/02* | (2009.01) |
| *H04B 1/3827* | (2015.01) |

(52) U.S. Cl.
CPC ......... *H04B 7/0608* (2013.01); *H04B 1/3833* (2013.01); *H04W 4/02* (2013.01)

(58) Field of Classification Search
CPC .. H04B 7/0608; H04B 1/3833; H04B 7/0802; H04B 17/102; H04B 7/0814; H04W 4/02; H04W 40/06; H04W 40/38
See application file for complete search history.

(56) References Cited

U.S. PATENT DOCUMENTS

| | | | | |
|---|---|---|---|---|
| 2005/0245204 A1* | 11/2005 | Vance | ..................... | H01Q 1/243 455/80 |
| 2008/0143609 A1* | 6/2008 | Mashima | ............... | H01Q 1/243 343/702 |
| 2012/0071203 A1* | 3/2012 | Wong | ..................... | H01Q 1/243 455/550.1 |
| 2013/0182867 A1* | 7/2013 | Knowles | .............. | H04B 7/0834 381/74 |

(Continued)

FOREIGN PATENT DOCUMENTS

CN 104348502 A 2/2015

*Primary Examiner* — Andrew Wendell
(74) *Attorney, Agent, or Firm* — Fish IP Law, LLC.

(57) ABSTRACT

A method for detecting operation state of a mobile terminal to adaptively adjust antenna state, comprises: step 1, outputting a detecting result when the external object is detected to be in proximity to or contacting a predetermined location of the mobile terminal; step 2, acquiring the operation state of the mobile terminal based on the detecting result; step 3, adjusting the antenna state based on the operation state. The present invention also discloses a sensing system capable of determining the usage scenario of the mobile terminal used by users; by using a design of integrating a sensor unit to the complete device, it can correctly determine a present method and scenario of a hand-held mobile terminal being used by user, so that the adjustable antenna can make a selection for a present user scenario better, and improve the radio-frequency performance of the complete device and the user experience.

16 Claims, 4 Drawing Sheets

(56) References Cited

U.S. PATENT DOCUMENTS

| | | | |
|---|---|---|---|
| 2014/0106684 A1* | 4/2014 | Burns | H01Q 1/243 455/78 |
| 2015/0341073 A1* | 11/2015 | Ayala Vazquez | H04B 1/40 455/77 |
| 2016/0056527 A1* | 2/2016 | Pascolini | G06K 9/00006 343/702 |
| 2016/0093955 A1* | 3/2016 | Ayala Vazquez | H01Q 9/0442 343/702 |
| 2016/0179338 A1* | 6/2016 | Miller | G06F 3/04817 345/174 |
| 2016/0187857 A1* | 6/2016 | Cho | G04R 20/00 368/47 |
| 2017/0033460 A1* | 2/2017 | Ayala Vazquez | H01Q 1/243 |

* cited by examiner

SYSTEM AND METHOD FOR DETECTING OPERATION STATE OF A MOBILE TERMINAL TO ADAPTIVELY ADJUST ANTENNA STATE

PRIORITY

The present application claims priority to and the benefit of Chinese Patent Application No. CN 201410714990.5, filed on Nov. 28, 2014, the entire content of which is incorporated herein by reference.

FIELD OF THE INVENTION

The present invention relates to electronic communications technologies, more specifically, to a method for determine operation state of hand-held mobile terminals.

DESCRIPTION OF THE RELATED ART

The miniaturization build-in antenna with multi-band frequency has always been the development direction of the hand-held communication terminal antenna. The existing antenna includes monopole antenna, single loop and dual loop antenna, IFA (Inverted-F Antenna), PIFA (Planar Inverted-F Antenna) etc. Each of the different types of antennas has its using condition and performance under the circumstances of the different hand-held communication terminals. Different type of antennas can be selected according to different conditions.

The mobile terminals generally includes GSM 850/900, DCS, PCS, UMTS and many other types of communication systems, of which the frequency range covers 0.824 GHz-0.96 GHz, 1.71 GHz-2.17 GHz. With the fast growing of 4G (the 4th Generation mobile communication technology), the present terminal devices require high frequency up to 2.7 GHz. In the past design of conventional antenna, the engineer mainly focuses on the performance of the complete device in free space. If the performance of the antenna in free space meets the need of the operators, the operators will affirm that the performance meets the requirement, and will allow the marketing and sales. It has been learned in the use that the state of the antenna is different due to different ways of usage by users, which made the operators and users begin to understand the antenna performance of the hand-held mobile terminals in actual use, and the industrial standards shift their attention from the index of free space to the operation state with people's head and hands in actual use. Therefore, it brings a change that the design of the antenna should meet the needs of not only the performance index in free space but also the antenna performance in the condition that the simulation of human head and hands is considered, which enhanced the difficulty of antenna design.

SUMMARY OF THE INVENTION

To solve the technical problems mentioned above, this invention provides a system for detecting operation state of a mobile terminal to adaptively adjust antenna state;

To solve the technical problems mentioned above, this invention also provides a method for detecting operation state of a mobile terminal to adaptively adjust antenna state.

The above technical problems to be solved in the present invention could be achieved by the technical scheme as follows:

A system for detecting operation state of a mobile terminal to adaptively adjust antenna state, comprising:

a sensor unit, outputting a detecting result when an external object is in proximity to or contacting with the sensor unit;

a processing unit, connected with the sensor unit, obtaining operation state of the mobile terminal according to the detecting result;

an adjusting unit, connected with the processing unit, adjusting the antenna state according to the operation state of the mobile terminal.

In the system mentioned above, the sensor unit comprises:

at least a detecting electrode, distributed over predetermined locations of the mobile terminal;

a detecting chip, connected with the detecting electrode, generating the detecting result according to outputs of the detecting electrode.

In the system mentioned above, further comprising:

a comparing unit, connected with the processing unit, comparing a present antenna state of the mobile terminal to the operation state and determining whether the present antenna state matches with the operation state, if the present antenna state does not match the operation state, generating an adjusting command.

In the system mentioned above, further comprising:

a setting unit, connected with the processing unit, which is configured to set a corresponding relation between the detecting result and the operation state.

In the system mentioned above, further comprising:

a storage unit, configured to store the corresponding relation.

In the system mentioned above, securing screws on the rear case of the mobile terminal are served as the detecting electrode; and/or, a USB socket of the mobile terminal is served as the detecting electrode; and/or, a headphone jack of the mobile terminal is served as the detecting electrode.

In the system mentioned above, the detecting chip is a capacitive proximity sensor chip.

In the system mentioned above, the external objects are a user's left hand and/or right hand and/or head.

A method for detecting operation state of a mobile terminal to adaptively adjust antenna state, wherein, used for a system comprising:

a sensor unit, outputting a detecting result when an external object is in proximity to or contacting with the sensor unit;

a processing unit, connected with the sensor unit, obtaining operation state of the mobile terminal according to the detecting result;

an adjusting unit, connected with the processing unit, adjusting the antenna state according to the operation state of the mobile terminal;

wherein, the method comprises:

step 1, outputting a detecting result when the external object is detected to be in proximity to or contacting a predetermined location of the mobile terminal;

step 2, acquiring the operation state of the mobile terminal based on the detecting result;

step 3, adjusting the antenna state based on the operation state.

In the method mentioned above, the sensor unit comprises:

at least a detecting electrode, distributed over predetermined locations of the mobile terminal;

a detecting chip, connected with the detecting electrode, generating the detecting result according to outputs of the detecting electrode.

In the method mentioned above, further comprising:

a comparing unit, connected with the processing unit, comparing a present antenna state of the mobile terminal to the operation state and determining whether the present antenna state matches with the operation state, if the present antenna state does not match the operation state, generating an adjusting command.

In the method mentioned above, further comprising:

a setting unit, connected with the processing unit, which is configured to set a corresponding relation between the detecting result and the operation state.

In the method mentioned above, further comprising:

a storage unit, configured to store the corresponding relation.

In the method mentioned above, wherein securing screws on the rear case of the mobile terminal are served as the detecting electrode; and/or, a USB socket of the mobile terminal is served as the detecting electrode; and/or, a headphone jack of the mobile terminal is served as the detecting electrode.

In the method mentioned above, wherein the detecting chip is a capacitive proximity sensor chip.

In the method mentioned above, wherein the external objects are a user's left hand and/or right hand and/or head.

In the method mentioned above, further comprising:

step 4, comparing a present antenna state of the mobile terminal to the operation state and determining whether the present antenna state matches with the operation state, if the present antenna state does not match the operation state, generating an adjusting command to adjust the antenna state.

By using the above mentioned technical scheme, the invention provides a sensing system that can determine a user operation state of the mobile terminal; by using a design of integrating a sensor unit into the complete device, it can correctly determine a present operation state and scenario of a hand-held mobile terminal used by user, so that the adjustable antenna can make a selection for a present user scenario better, and improve the radio-frequency performance of the complete device and the user experience.

BRIEF DESCRIPTIONS OF THE DRAWINGS

The accompanying drawings, together with the specification, illustrate exemplary embodiments of the present disclosure, and, together with the description, serve to explain the principles of the present invention.

DETAILED DESCRIPTION

It is described clearly and entirely for the technical solution of the invention with the accompanying drawings. Obviously, the described embodiments of the invention are part of the embodiments, and not the complete embodiments. Based on the embodiments of the invention, all the other embodiments obtained by the people skilled in the art without creative effect will also fall in the scope of the invention.

It is noted that the embodiments and the features thereof can be combined with each other without conflicting.

It is described clearly and entirely for the technical solution of the invention with the accompanying drawings and embodiments, and not for limiting the invention.

The conventional design of the existing antenna is to change the original antenna state by utilizing antenna switch, variable capacity and other components for each frequency band, so that it can maximize its compatibility with the performance of free space and of simulating human hand and head in corresponding frequency band. Thus it can meet the test requirements of operators. This practice copes with shifting events by sticking to a fundamental method. A mass of verification for different frequency bands needs to be done at the initial stage of design. By presenting a set of listings, of which the state meets the performance requirements covering free space, simulating hand and head in parts of the frequency bands, into mobile phone, it can find out the fixed state in the listings in different operation frequency. Thus the antenna performance can be improved. However, because of different user habits and different scenarios, this practice cannot analyze the present state of hand-held terminal qualitatively, which causes the major performance differences in different application scenarios for corresponding frequency band.

Figure 1:
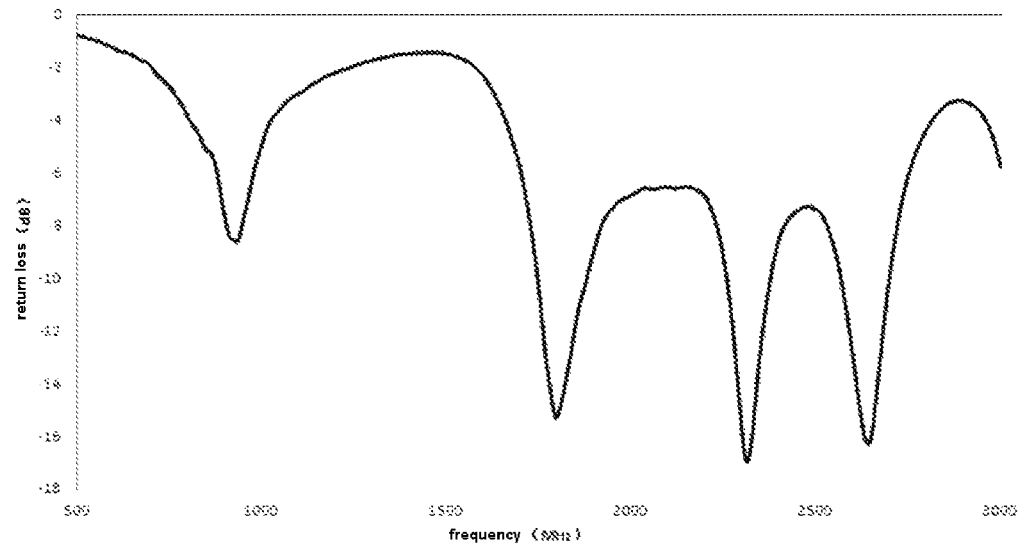
FIG. 1 is the return loss of a conventional 4G antenna in free space.

FIG. 1 is the return loss of a conventional 4G antenna in free space. As shown in FIG. 1, in free space, the antenna can cover low frequency, and all the state of high frequency 2G\3G\TDD-TLE 4G Bands 38, 39, 40, 41. The test performance of the antenna in free space can meet the requirements of the operators.

Figure 2:
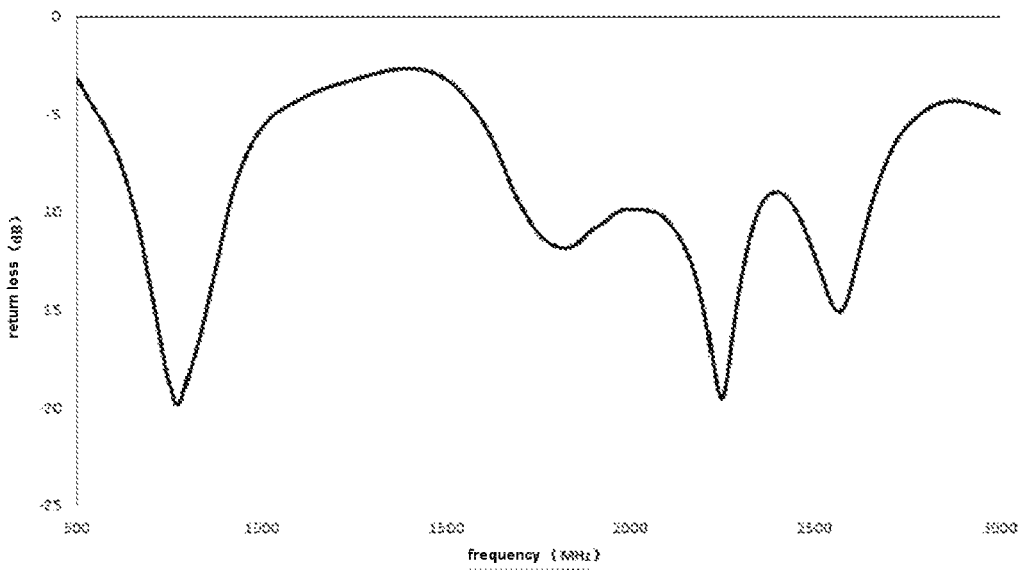
FIG. 2 is the return loss of a conventional 4G antenna hold by right hand.

The applicant did the experiment on the mobile terminal held by a right hand model, and achieved the return loss of a conventional 4G antenna held by right hand shown in FIG. 2, and it can be seen that entire antenna state shifts to low frequency. Due to the absorbing effect of the human hand model, the entire return loss is magnified. The three resonance offsets of the high band are obviously different. Part of the frequency deviates from the original operation frequency of the antenna.

Figure 3:
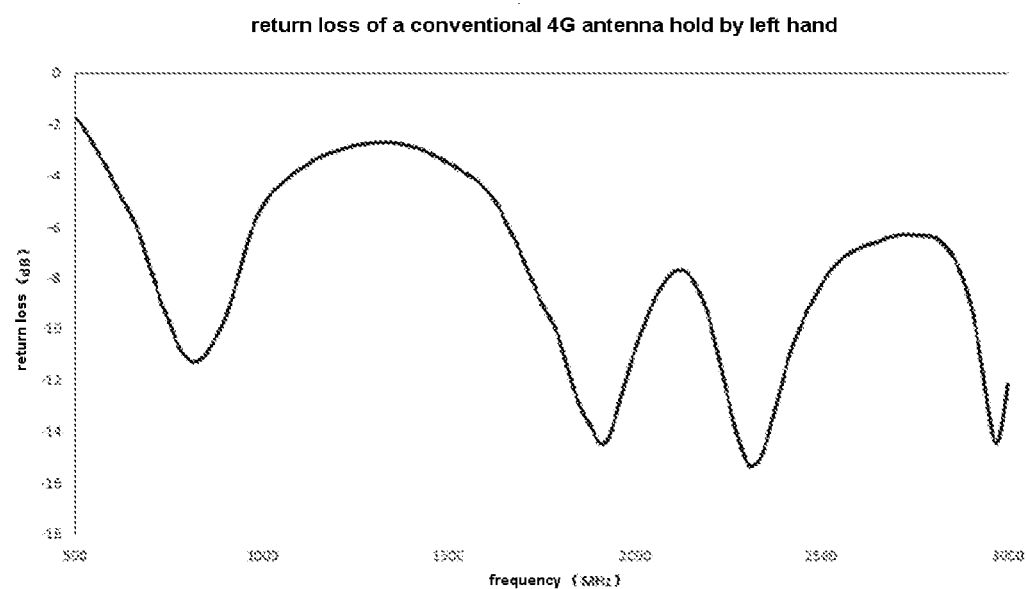
FIG. 3 is the return loss of a conventional 4G antenna hold by left hand.

Yet, the applicant did the experiment on the mobile terminal held by left hand model, and achieved the return loss of a conventional 4G antenna held by left hand shown in FIG. 3, and it can be seen that entire antenna state shifts to low frequency similarly. Due to the absorbing effect of the human hand model, the entire return loss is magnified. The three resonance offsets of the high band are obviously different, and left-hand-held state and right-hand-held state are very different.

Figure 4:
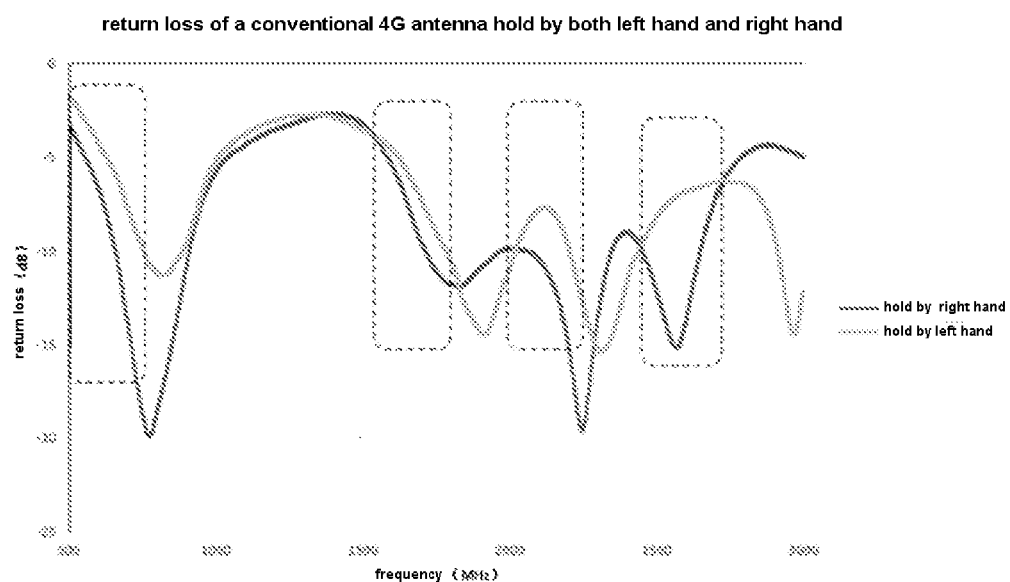
FIG. 4 is the return loss of a conventional 4G antenna hold by both left hand and right hand.

After combining and comparing the return loss diagrams of FIG. 2 and FIG. 3, FIG. 4 is a comparison chart showing the return loss of a conventional 4G antenna held by left hand and the return loss of a conventional 4G antenna held by right hand. It can be seen directly from the four dashed box illustrated in the figure that the offset and change of the antenna itself is completely different in the condition that the same antenna is held by different hands. It indicates it is not accurate that applying a preconfigured antenna state to the actual condition that people hold the antenna with different hands, which is caused by the different antenna state in the four dashed box in FIG. 4. It is obvious that it cannot achieve the best RF performance through applying the same antenna state to different antenna states.

Figure 5:
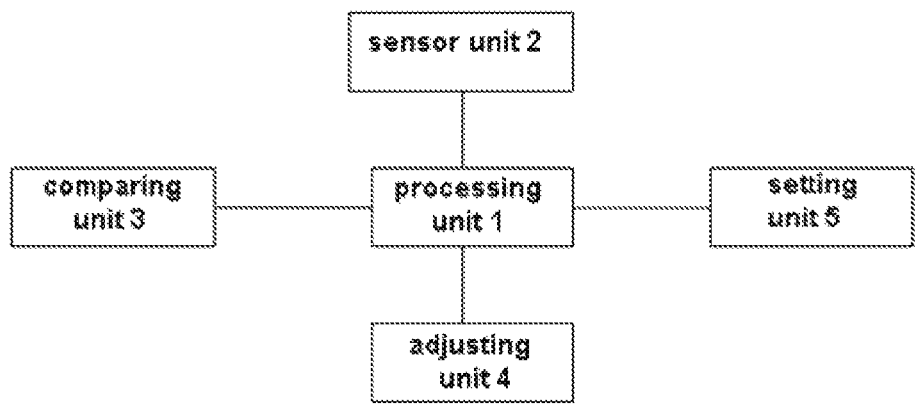
FIG. 5 is a schematic diagram of distribution of the detecting electrodes over a mobile terminal.

As shown in FIG. 5, a system of detecting operation state of a mobile terminal to adaptively adjust the antenna state, comprising:

a sensor unit 2, outputting a detecting result when an external object is in proximity to or contacting with the sensor unit;

a processing unit 1, connected with the sensor unit 2, obtaining operation state of the mobile terminal according to the detecting result;

an adjusting unit 4, connected with the processing unit 1, adjusting the antenna state according to the operation state of the mobile terminal.

The system of the present invention further comprises a comparing unit 3, connected with the processing unit 1, comparing a present antenna state of the mobile terminal to the operation state and determining whether the present antenna state matches with the operation state, if the present antenna state does not match the operation state, generating an adjusting command.

The system of the present invention further comprises a setting unit 5, connected with the processing unit 1, which is configured to set a corresponding relation between the detecting result and the operation state.

The system of the present invention further comprises a storage unit, configured to store the corresponding relation.

The system of the present invention, wherein the sensor unit 2 comprises:

at least a detecting electrode, distributed over predetermined locations of the mobile terminal;

a detecting chip, connected with the detecting electrode, generating the detecting result according to outputs of the detecting electrode.

The above mentioned detecting chip could be a capacitive proximity sensor chip. The capacitive proximity sensor can detect any conductive object and any object with different dielectric properties. The detecting electrode could be the securing screws on the rear case of the mobile terminal; and/or, a USB socket of the mobile terminal; and/or, a headphone jack of the mobile terminal; and/or the metal rim of the camera of the mobile terminal; and/or other metal parts of mobile terminal.

Figure 6:
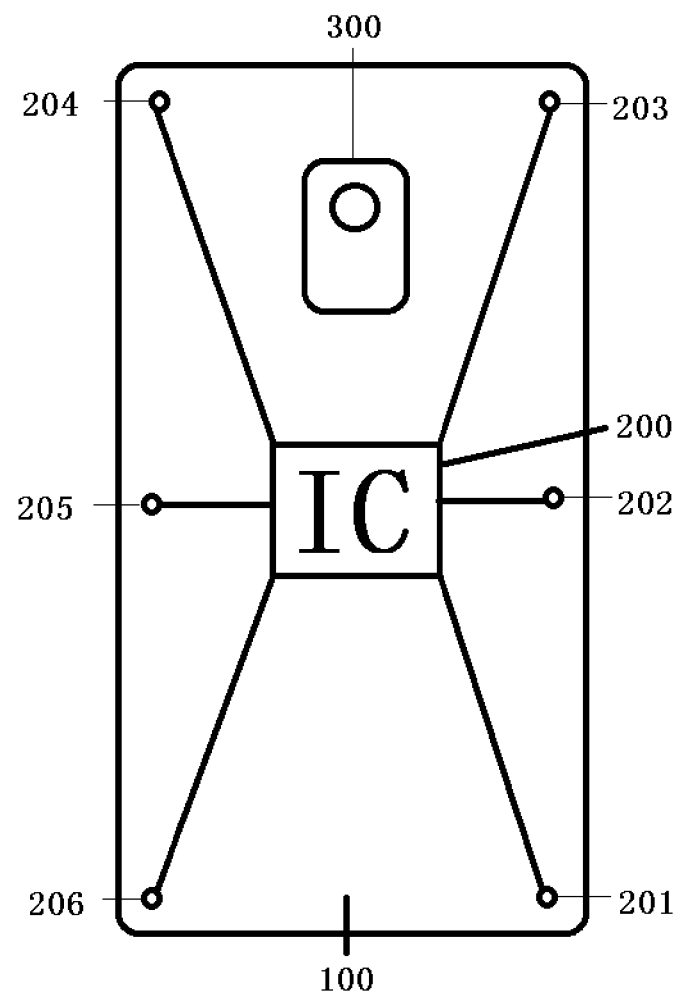
FIG. 6 is a system structure diagram according to the present invention.

In an embodiment of the present invention, as shown in FIG. 6, which is a structure diagram of the rear case of a hand-held mobile terminal 100, it illustrates the relative position of the components in a complete device. A detecting chip 200, as shown in FIG. 5, is configured on the PCB inside the hand-held mobile terminal 100 and is connected with the detecting electrodes 201, 202, 203, 204, 205, 206 respectively. The detecting chip 200 is configured with two modes, which are proximity (to human body) mode and contacting (with human body) mode. It may use conducting medium for the accurate judgment of proximity or contact of external objects, such as a human body. The detecting electrodes 201, 202, 203, 204, 205, 206 are screws that used to fix the case of the conventional hand-held mobile terminals. In this embodiment of the present invention, screws, which is connected with the detecting chip 200 via wires on the PCB, are used as the medium for detecting external objects, as an external sense device of the sensor, and to assist to realize the function of the invention. The metal frame of the rear camera 300 of the conventional hand-held mobile terminal can also be used as a detecting electrode for detecting.

In the system of the present invention, wherein the external objects are a user's left hand and/or right hand and/or head. When the external object is a right hand of the user, the antenna state will be adjusted to the right-hand-held antenna state. When the external object is a left hand of the user, the antenna state will be adjusted to the left-hand-held antenna state.

An embodiment according to the invention, the storage test of China Mobile (CMCC) is required to perform a test on the performance of the antenna held by right hand model.

In the test of China Mobile, it uses the right hand model which is MCL 3.2 in CTIA (Cellular Telecommunications Industry Association). In the condition of the mobile held by right hand, there are constant touch detecting electrodes 205, 206 and 202. When the detecting chip 200 detected that three detecting electrodes was contacting or was in proximity to a human body, the adjustable antenna could be adjusted to the right-hand-held antenna state. Likewise, if the complete device needs aboard marketing, and needs testing the performance of antenna held by left hand model, it only requires to determine a set of antenna state which is better for the antenna held by left hand in the initial stage of debugging of the mobile phone. For example, if the detecting chip 200 detected that three detecting electrodes 201, 202, 205 was contacting human body, it will be switched to the left-hand-held antenna state. The specific point contacting the human hands is not selected randomly. It can be determined according to the fixed test model of the test organization. The test model has global universality and applies to the third party test organizations in the world.

In a specific application, when the user holds the hand-held mobile terminal horizontally for playing game and watching movies, the user is contacting or in proximity to detecting electrodes 203, 204, 201 and 206 constantly. When the detecting chip 200 detects that these four detecting electrodes are contacting or was in proximity to an external object, the preset antenna state which is better for the landscape mode will be used to improve the RF performance of the complete device.

The invention distinguishes the operation state through detecting sensing condition adjacent to different screws by the detecting chip so that it can select the antenna state of the adjustable antenna specifically in order to select the optimal antenna state and improve the user experience.

Figure 7:
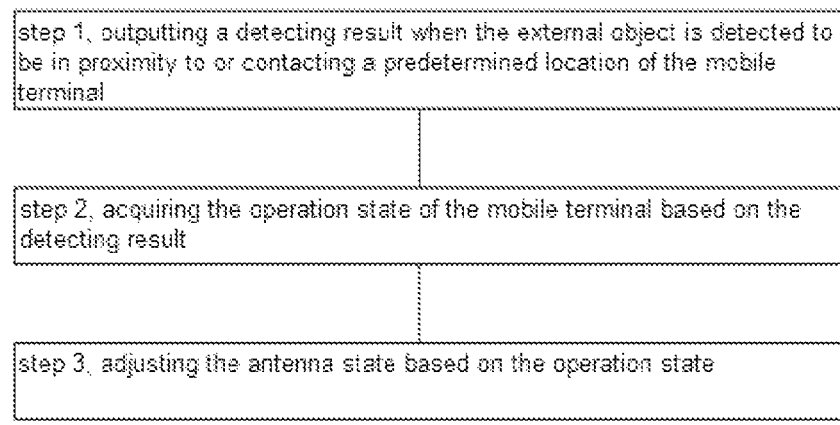
FIG. 7 is a schematic diagram of the implement method of the present invention.

The present invention also provides a method for detecting operation state of a mobile terminal to adaptively adjust antenna state, as shown in FIG. 7, comprising:

step 1, outputting a detecting result when the external object is detected to be in proximity to or contacting a predetermined location of the mobile terminal;

step 2, acquiring the operation state of the mobile terminal based on the detecting result;

step 3, adjusting the antenna state based on the operation state.

In the method of the present invention, further comprising:

step 4, comparing a present antenna state of the mobile terminal to the operation state and determining whether the present antenna state matches with the operation state, if the present antenna state does not match the operation state, generating an adjusting command to adjust the antenna state.

The present invention can further subdivide the contacting mode and the proximity mode, so that it can make the final optimum selection according to the subdividing, and complete the improvement of the entire performance. For example, if the complete device is inside a trouser pocket, all the sensing points are in the proximity mode; if the complete device is in the condition of receiving or dialing a call, it is in the mode that the human hands and human head are proximity simultaneously. In these two conditions and others, it is possible to verify the specific sensing points in the initial experiments, and select the better preset antenna state for use. The position of the detecting chip of the invention is not limited to the position which shows in the figure, and may be positioned according to the PCB layout. The detecting electrodes are also not limited to the above mentioned embodiments. Structure components made from other metal materials may also be selected according to the detecting state. Meanwhile, the number of detecting electrodes is not limited to six shown in the Figures. The number and position can be adjusted in order to meet the need of subdividing of state mode. For example, in the terminals like PAD, the number of sensing devices could be increased as needed. According to different scenarios, the position of the sensing device may also be changed. Theoretically, adding infinite number of sensing device can be considered for simulating the usage scenario and sampling data for analyzing the user operation state in order to determine the scenario more accurately.

For the adjustment of the antenna state, according to the development of antenna design technology, several kinds of switchable and adjustable antennas are applied in the market.

In an embodiment according to the invention, it provides a double antenna mode configured by positioning two double antennas with common frequency on two ends of the hand-held mobile terminal respectively. When it detects that one end is influenced, it will proactively switch to another antenna so that it improves the radiation performance of the present scenario.

In another embodiment according to this invention, it provides an antenna structure switch mode is the mode that can change the original antenna structure of the single antenna by control a switch which is configured in the initial stage of the design of antenna, so that it completes the change from a single antenna to various antennas. Through the modes presented in the initial design of antenna, it can be selected to be applied in different scenarios in order to improve the radiation performance of the present scenario, and it can be seen as having different antennas in the same position.

In another embodiment according to the invention, it provides an antenna impedance adjusting mode is the mode that makes a single antenna presents different resonance state by adjusting an adjustable capacitor which is configured in the appropriate position of the antenna. The specific application is similar to the antenna structure switch mode. Antenna featured states was presented in early state for a variety of scenario, and the optimum selection is made according to the scenario identified by the chip. It can be seen as resonance adjustable for the same antenna.

The above embodiments can be used solely or in combination. Even there is new designing scheme for adjusting antenna in the future, the discriminating method of this invention can also be used for discriminating the scenarios.

The antenna of this invention can be monopole antenna, single loop and dual loop antenna, IFA (Inverted-F Antenna), PIFA (Planar Inverted-F Antenna), PCB antenna, Flexible Printed Circuit board (FPC), Metal stamping, Laser Direct Structuring (LDS) antenna.

The description listed above is detailed description of embodiments of the invention. It should be understood that the invention is not limited by the above embodiments. Any changes and modifications of the invention fall in the scope of the application for the skilled in the art. Therefore the changes and modifications made without departing from the spirit and scope of the invention fall in the scope of the invention.

What is claimed is:

1. A system for detecting operation state of a mobile terminal to adaptively adjust antenna state, comprising:
a sensor unit comprising a detecting electrode distributed over predetermined locations of the mobile terminal and a detecting chip, coupled with the detecting electrode, generating a detecting result according to outputs of the detecting electrode when an external object is within a proximity with the sensor unit;
a processing unit, connected with the sensor unit, obtaining operation state of the mobile terminal according to the detecting result;
an adjusting unit, connected with the processing unit, adjusting the antenna state according to the operation state of the mobile terminal;
wherein the external object comprises at least one of a user's left hand, right hand and head,
wherein the adjusting unit adjusts the antenna state to a right-hand-held antenna state when the external object comprises a right hand of the user and to a left-hand-held antenna state when the external object comprises a left hand of the user, and
wherein the detecting electrode is selected from the group consisting of (a) securing screws on a rear case of the mobile terminal, (b) a USB socket of the mobile terminal, and (c) a headphone jack of the mobile terminal.

2. The system of claim 1, further comprising:
a comparing unit, connected with the processing unit, comparing a present antenna state of the mobile terminal to the operation state and determining whether the present antenna state matches with the operation state, if the present antenna state does not match the operation state, generating an adjusting command.

3. The system of claim 1, further comprising:
a setting unit, connected with the processing unit, which is configured to set a corresponding relation between the detecting result and the operation state.

4. The system of claim 3, further comprising:
a storage unit, configured to store the corresponding relation.

5. The system of claim 1, wherein the detecting chip is a capacitive proximity sensor chip.

6. A method for detecting operation state of a mobile terminal to adaptively adjust antenna state, wherein, used for a system comprising:
a sensor unit comprising a detecting electrode distributed over predetermined locations of the mobile terminal and a detecting chip, coupled with the detecting electrode, generating a detecting result according to outputs of the detector electrode when an external object is within a proximity with the sensor unit;
a processing unit, connected with the sensor unit, obtaining operation state of the mobile terminal according to the detecting result; and
an adjusting unit, connected with the processing unit, adjusting the antenna state according to the operation state of the mobile terminal,
wherein, the method comprises:
step 1, outputting a detecting result when the external object is detected to be in proximity to or contacting a predetermined location of the mobile terminal;
step 2, acquiring the operation state of the mobile terminal based on the detecting result;
step 3, adjusting the antenna state based on the operation state,
wherein the external object comprises at least one of a user's left hand, right hand and head,
wherein the adjusting unit adjusts the antenna state to a right-hand-held antenna state when the external object is a right hand of the user and to a left-hand-held antenna state when the external object is a left hand of the user, and wherein the detecting electrode is selected from the group consisting of (a) securing screws on a rear case of the mobile terminal, (b) a USB socket of the mobile terminal, and (c) a headphone jack of the mobile terminal.

7. The method of claim 6, wherein the sensor unit comprises:
   at least a detecting electrode, distributed over predetermined locations of the mobile terminal;
   a detecting chip, connected with the detecting electrode, generating the detecting result according to outputs of the detecting electrode.

8. The method of claim 6, further comprising:
   a comparing unit, connected with the processing unit, comparing a present antenna state of the mobile terminal to the operation state and determining whether the present antenna state matches with the operation state, if the present antenna state does not match the operation state, generating an adjusting command.

9. The method of claim 6, further comprising:
   a setting unit, connected with the processing unit, which is configured to set a corresponding relation between the detecting result and the operation state.

10. The method of claim 9, further comprising:
    a storage unit, configured to store the corresponding relation.

11. The method of claim 7, wherein securing screws on the rear case of the mobile terminal are served as the detecting electrode; and/or, a USB socket of the mobile terminal is served as the detecting electrode; and/or, a headphone jack of the mobile terminal is served as the detecting electrode.

12. The method of claim 7, wherein the detecting chip is a capacitive proximity sensor chip.

13. The method of claim 6, further comprising:
    step 4, comparing a present antenna state of the mobile terminal to the operation state and determining whether the present antenna state matches with the operation state, if the present antenna state does not match the operation state, generating an adjusting command to adjust the antenna state.

14. The method of claim 7, further comprising:
    step 4, comparing a present antenna state of the mobile terminal to the operation state and determining whether the present antenna state matches with the operation state, if the present antenna state does not match the operation state, generating an adjusting command to adjust the antenna state.

15. The method of claim 8, further comprising:
    step 4, comparing a present antenna state of the mobile terminal to the operation state and determining whether the present antenna state matches with the operation state, if the present antenna state does not match the operation state, generating an adjusting command to adjust the antenna state.

16. The method of claim 9, further comprising:
    step 4, comparing a present antenna state of the mobile terminal to the operation state and determining whether the present antenna state matches with the operation state, if the present antenna state does not match the operation state, generating an adjusting command to adjust the antenna state.

* * * * *